United States Patent [19]
Johnson et al.

[11] 3,710,178
[45] Jan. 9, 1973

[54] SPARK-GAP TRIGGERING SYSTEM

[75] Inventors: David A. Johnson, Palo Alto; Arthur F. Wickersham, Menlo Park, both of Calif.

[73] Assignee: Stanford Research Institute, Menlo Park, Calif.

[22] Filed: Sept. 14, 1970

[21] Appl. No.: 71,960

[52] U.S. Cl. ..................315/149, 313/198, 313/203, 315/330
[51] Int. Cl. .......................H01j 17/00, H05b 37/02
[58] Field of Search..............313/174, 203, 325, 198; 315/149, 150, 330

[56] References Cited

UNITED STATES PATENTS

| | | | |
|---|---|---|---|
| 3,093,767 | 6/1963 | Lafferty | 313/174 |
| 3,524,101 | 8/1970 | Barbini | 315/150 |
| 352,625 | 11/1886 | Lyman et al | 313/203 |
| 3,294,970 | 12/1966 | Jenckel | 315/149 X |

FOREIGN PATENTS OR APPLICATIONS 377,238  7/1932  Great Britain....................313/203 X

*Primary Examiner*—Roy Lake
*Assistant Examiner*—Lawrence J. Dahl
*Attorney*—Urban H. Faubion and Lindenberg, Freilich and Wasserman

[57] ABSTRACT

A triggerable spark-gap is provided wherein the main gap discharge time is controlled by placing an auxiliary pair of discharge electrodes inside one of the main gap electrodes and causing a discharge for emitting ultra-violet light. The ultra-violet light illuminates the region in which the main discharge channel will form through a small aperture in the one of the main electrodes within which the auxiliary pair of electrodes are placed.

3 Claims, 2 Drawing Figures

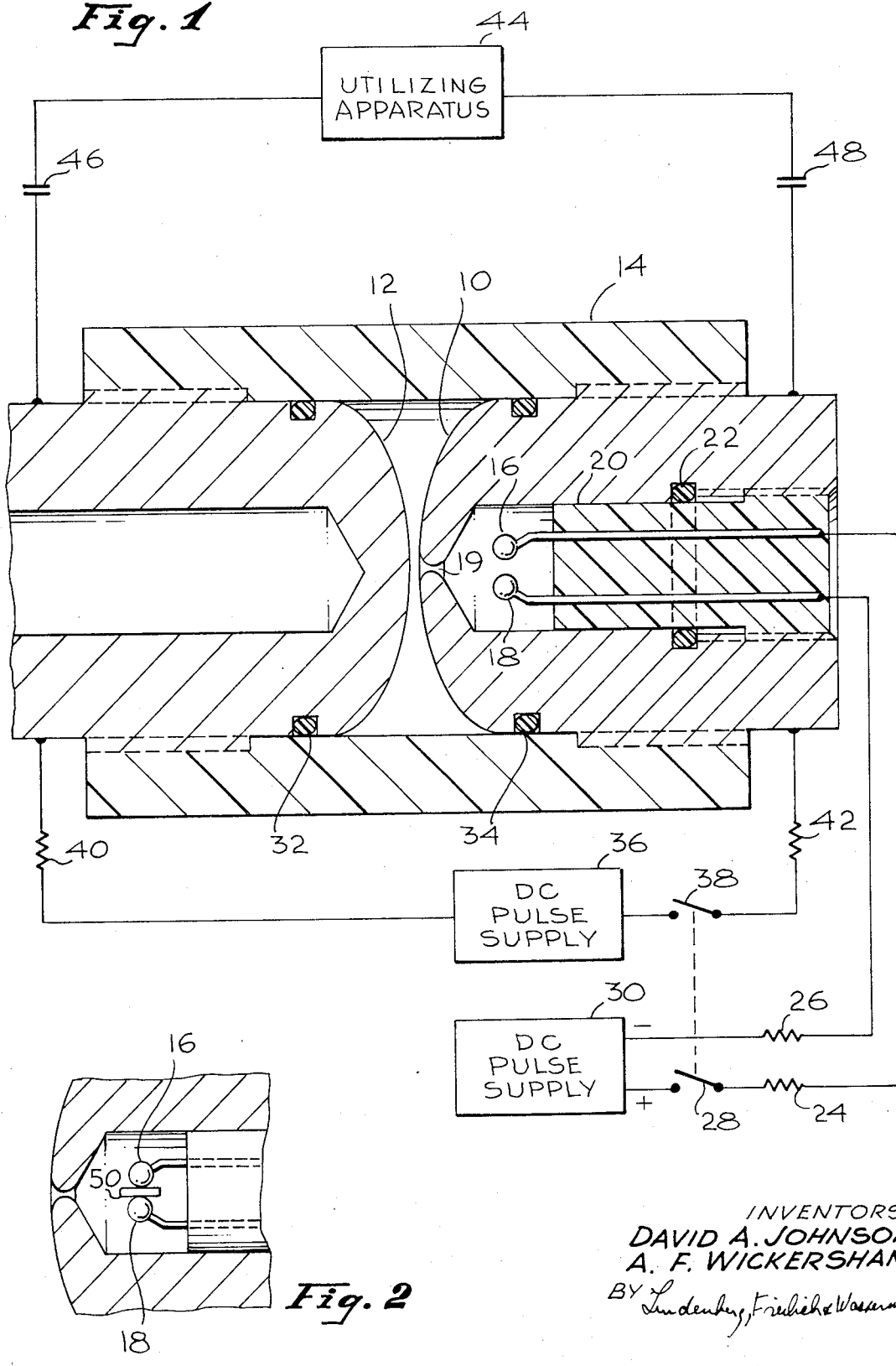

SPARK-GAP TRIGGERING SYSTEM

BACKGROUND OF THE INVENTION

This invention relates to spark-gap discharge systems and more particularly to systems for accurately controlling the switching time of said spark gaps.

In radar system and in many other applications wherein spark-gaps are used for generating a signal, it is desirable to control switching time accurately. Particularly in radar systems, an accurately controlled pulse repetition frequency enables the system to detect Doppler shifts in the return echos, allows an integration of many pulses to increase the effect of signal to noise ratio, and finally permits the synchronizing of several transmitters as elements of an antenna array. Pulse repetition accuracy can be measured by the variation in time intervals between successive pulses, and this is called "jitter."

In the applications mentioned above, the jitter time must be small compared to the period of the electromagnetic wave radiated in the pulse. For example, if the pulse has a carrier frequency of 100 MHz, then the period is 10 ns and the jitter must be small compared to the period, say 1 ns or less. In other words, if coherency between pulses is to be maintained, the jitter time must be 1 ns or less. In order to accurately control the switching time of spark-gaps, it is necessary to understand some of the causes of jitter.

One of the causes of variation in discharge time in an over-volted spark-gap is the statistical variation in hold-off time: the length of time required to develop a conducting channel of plasma between the electrodes. By over-volted, we mean that the electric field across the gap is greater than the minimum field required to eventually produce a conducting channel. Variation in hold-off time, which derives ultimately from random processes in the gas between the electrodes, can never be completely eliminated but can be minimized by large over-volting and by using as small a gap as possible. Large over-volting can be achieved in several ways: for example, by introducing a third trigger electrode or, as will be described later, by ionizing the gas in the gap after a high voltage has been applied across the gap. The gap itself can be made small, at any given working voltage, by using as high a pressure in the gas as is practical.

Another cause of jitter is the wandering of the spark channel. During operation it has been observed that the spark channel between two electrodes will form in essentially the same location for several pulses and then, at some random time, the channel will form in a new location slightly displaced from the preceding one, and continue in the new location for an arbitrary length of time. Whenever such changes in location occur, it has been observed, by monitoring the pulses with a fast oscilloscope, that large variations in switching time or jitter occurs.

OBJECTS AND SUMMARY OF THE INVENTION

An object of this invention is to provide a spark-gap switching system which reduces jitter to values far less than obtainable heretofore.

Another object of this invention is the provision of a substantially accurately controllable switching time for a spark gap system.

Still another object of the invention is the provision of a spark-gap design which minimizes jitter by minimizing the ability of the spark-channel to wander.

Yet another object of the present invention is the provision of a novel, useful and improved design for controlling the switching of the spark-gap.

These and other objects of the invention may be achieved in an arrangement for a spark-gap wherein a pair of auxiliary electrodes which provide an additional spark-gap, are employed to trigger or control the firing time of the main spark-gap. These triggering electrodes are positioned within a chamber in one of the main spark-gap electrodes. A small opening through the wall of this chamber opens onto the adjacent main spark-gap electrode and serves to determine the location of the spark channel that will be generated whereby jitter caused by wandering of the main channel from pulse to pulse is minimized. The auxiliary pair of electrodes causes an ultra-violet flash when discharged thereby illuminating the main spark-gap and causing it to discharge.

BRIEF DESCRIPTION OF THE DRAWINGS

FIG. 1 of the drawing is a cross sectional view of the main spark-gap electrodes and the auxiliary electrodes constituting the embodiment of the invention.

FIG. 2 of the drawing is a partial sectional view of a modification of the embodiment of the invention.

DESCRIPTION OF THE PREFERRED EMBODIMENT

Referring now to FIG. 1 of the drawing, there is shown a cross-sectional view of an embodiment of the invention. This includes the two cylindrical electrodes, respectively anode 10 and cathode 12 of the main spark-gap. These are aligned axially and are retained spaced from one another by a surrounding plastic housing 14, having internal threads to enable the positioning and holding of the anode and cathode electrodes.

A pair of auxiliary electrodes respectively 16, 18 are preferably placed within a chamber opening in the anode electrode. These auxiliary electrodes are supported by a plastic plug 20, which is threadably engaged with the interior of the anode 10. An O-ring 22 assists in sealing the chamber within which the auxiliary electrodes extend. These auxiliary electrodes extend through the plastic plug and are connected through the respective charging resistors 24, 26 and through a switch 28, to the DC supply source 30. A small opening 19 is placed in the chamber wall and opens onto the adjacent cathode electrode.

The main spark-gap electrodes on their respective outer peripheries also have provision for O-rings 32, 34, respectively which assist in sealing the region between the spark-gap electrodes comprising the main gap. This is filled with a gas at high pressure, preferably nitrogen gas since it has a transmission window in the ultra-violet region.

The main spark-gap electrodes are charged from a DC supply source 36 which is connected through a switch 38 and their respective charging resistors 40, 42, to the respective cathode and anode 12, 10, of the main spark-gap electrodes. The switches 28 and 38 may be ganged with one another if it is desired, to operate in a sequence with the switch 38 being closed first. The radio frequency energy generated by the discharge in the sparkngap may be applied to utilizing apparatus 44, from the respective electrodes through capacitors 46, 48.

In operation, upon closing the switch 28, a high voltage pulse is applied from the DC pulse supply 30 to the electrode 16, 18, causing them to generate a pulse of ultra-violet illumination. This pulse of ultra-violet light accomplishes two things. First, it ionizes the gas between the main electrodes and causes emission of electrons from the surface of the electrodes, it thus reduces the voltage which can be maintained across the main gap; in other words, it effectively over-volts the main gap and causes a rapid formation of a conducting channel of plasma. Secondly, due to the aperture 19 which opens from the chamber containing the auxiliary electrodes onto the main gap, the ultra-violet flash is collimated by this aperture which restricts the location of the conducting channel... that is, it reduces wandering of the spark channel from pulse to pulse.

The ultra-violet flash which controls the main gap firing time is generated by prompt emission from the auxiliary electrodes at the instant a high voltage pulse is applied to them. The main gap ionization is not subject to the jitter associated with the formation of ionization in the auxiliary gap. The basis of this invention is the fact that the channel between the auxiliary electrodes forms at a time which is later than the time when a conducting channel has already started to form in the main gap. Actually, it is not necessary to have a spark channel formed in the auxiliary electrodes. The gap between these electrodes can be filled with a piece of barium titinate, which acts as a good source of promptly emitted ultra-violet radiation when a high voltage pulse is rapidly applied to the electrodes. FIG. 2 illustrates a piece of barium titinate placed between the two auxiliary electrodes 16, 18.

Alternatively, a conducting channel can be allowed to form in the auxiliary electrode gap without decreasing over-all performance in terms of jitter time, since such channel forms after a channel has already started to form in the main gap. Thus, the main gap discharge is not affected by statistical variation in hold-off time in the trigger gap. However, the discharge through the channel in the trigger gap can give rise to spikes and these, in turn, cause variations in the promptly emitted ultra-violet light in subsequent pulses and thus cause jitter in the main gap. These spikes, which appear to be minute slivers of solidified or crystallized metal deposited on the electrode surface during the high temperature of a previous discharge, can be avoided by using trigger electrodes made of carbon.

By way of illustration, but not to serve as a limitation upon the invention, spark-gaps of the type shown have been operated with short pulse radar transmitters and field operation at gas pressures of 30 to 80 psi and operating voltage between 30 and 100 kv generating pulses of radio energy at 150 MHz. Jitter time has been achieved on the order of a few nanoseconds and has been reduced to a fraction of a nanosecond when the voltage supplies are regulated with the operating voltages being maintained at 60 kv and the gas pressure is held constant between values of 30 and 60 psi.

There has accordingly been described and shown a novel and useful system for controlling the switching of a spark-gap by the use of field emission of ultra-violet light from an auxiliary pair of electrodes or alternatively from barium titinate placed in the gap between the auxiliary electrodes. The ultra-violet light source is located inside the main gap electrode and illuminates the region in which the main channel for the main gap forms through a small aperture in one of the main electrodes.

What is claimed is:

1. A system for controlling an electrical discharge in the gap provided between a pair of spaced aligned main electrodes comprising:
   a chamber within one of said main electrodes positioned at the side thereof closest to the other of said main electrodes,
   an entrance opening into said chamber extending from the side of said one of said two electrodes adjacent said gap, said entrance opening being small relative to the size of said chamber,
   a pair of auxiliary electrodes positioned within said chamber, said auxiliary electrodes being positioned spaced from one another to form a gap therebetween and being substantially axially aligned with said entrance opening,
   insulating means for supporting said auxiliary electrodes within said chamber, and
   means for energizing said main and auxiliary electrodes whereby a spark is formed in the gap between said main electrode upon energization of said auxiliary electrodes.

2. Apparatus as recited in claim 1 wherein said auxiliary electrodes are made of carbon and said gap between said main electrodes is enclosed and filled with nitrogen gas.

3. Apparatus as recited in claim 1 wherein a piece of barium titinate is positioned in the space between said auxiliary electrodes.

* * * * *